US008280344B2

(12) United States Patent
O'Reilly

(10) Patent No.: US 8,280,344 B2
(45) Date of Patent: Oct. 2, 2012

(54) DYNAMIC TELEPHONE DIRECTORY FOR WIRELESS HANDSETS

(75) Inventor: James O'Reilly, Galway (IE)

(73) Assignee: Rivada Networks LLC, Arlington, VA (US)

( * ) Notice: Subject to any disclaimer, the term of this patent is extended or adjusted under 35 U.S.C. 154(b) by 537 days.

(21) Appl. No.: 12/477,516

(22) Filed: Jun. 3, 2009

(65) Prior Publication Data

US 2009/0298461 A1    Dec. 3, 2009

Related U.S. Application Data

(60) Provisional application No. 61/058,303, filed on Jun. 3, 2008.

(51) Int. Cl.
*H04M 11/04* (2006.01)
(52) U.S. Cl. .......... 455/404.2; 455/404.1; 455/456.1; 455/456.2; 455/456.3; 455/456.5; 455/456.6
(58) Field of Classification Search .......... 455/404.2, 455/404.1, 456.1, 456.2, 456.3, 456.5, 456.6
See application file for complete search history.

(56) References Cited

U.S. PATENT DOCUMENTS

| 2002/0068599 A1* | 6/2002 | Rodriguez et al. ............ 455/550 |
| 2006/0009191 A1* | 1/2006 | Malone, III ................ 455/404.1 |
| 2007/0041556 A1* | 2/2007 | Rana et al. ................ 379/218.01 |
| 2007/0287474 A1* | 12/2007 | Jenkins et al. ............ 455/456.2 |

* cited by examiner

*Primary Examiner* — Dwayne Bost
*Assistant Examiner* — William F Rideout
(74) *Attorney, Agent, or Firm* — The Marbury Law Group PLLC

(57) ABSTRACT

Systems and methods deliver a dynamic telephone directory to wireless handsets of emergency services personnel for responding to an incident. When an incident occurs, wireless handsets of emergency services personnel near the incident are identified. An incident-specific telephone directory is generated using information stored in a database of emergency response personnel including wireless handsets of emergency services personnel within an incident response area plus personnel outside the area with responsibilities for managing or assisting in the incident response. The incident-specific telephone directory is then delivered to wireless handsets of emergency services personnel. The database of emergency services personnel and the incident-specific telephone directory may be organized by name, roles and responsibilities, agency, geography, incident type, and response plan. Wireless handsets within an incident response area may be those wireless handsets accessing a private network provided for emergency communications or by wireless handsets reporting their location to a central server.

52 Claims, 13 Drawing Sheets

| ID | Name | Role/Responsibility | Phone No. | Region | Networks | | | | Contact Lists | | | NRP | | | | |
|---|---|---|---|---|---|---|---|---|---|---|---|---|---|---|---|---|
| | | | | | A | B | C | D | 1 | 2 | 3 | V | W | X | Y | Z |
| 157 | John Smith | FEMA Dir. | 888-555-1684 | All | X | | | | X | | | X | X | X | X | |
| 681 | Taylor Made | FEMA Reg. 1 Dir. | 888-555-5976 | 1 | X | X | | | X | X | | X | X | X | X | X |
| 682 | Tom Smyth | FEMA Reg. 2 Dir. | 888-555-6234 | 2 | X | X | | | X | X | | X | X | X | X | X |
| 683 | Ben Fishen | FEMA Reg. 3 Dir. | 888-555-8641 | 3 | X | X | | | X | X | | X | X | X | X | X |
| 684 | Jane Smyth | FEMA Reg. 4 Dir. | 888-555-8856 | 4 | X | X | | | X | X | | X | X | X | X | X |
| 968 | John Doe | Interior Liaison | 888-555-3348 | All | X | X | | | X | X | | X | X | | | |
| 248 | Jane Smith | FEMA Coordinator | 888-555-3498 | All | | X | X | | X | | | X | X | X | X | X |
| 382 | TBD | State Governor | TBD | State | X | | | | | | | | | | | |
| 587 | Gen. Doe | Nat. Guard Cmdr | 888-555-4523 | All | X | | | | X | | | X | X | X | X | X |
| 765 | TBD | State Nat. Guard | TBD | State | | X | | | X | | | X | X | X | X | X |
| 492 | TBD | Local Nat. Guard | TBD | 1 | | X | X | X | | X | | X | X | X | X | X |
| 628 | TBD | Local Mayor | TBD | 1 | | X | X | | | X | | X | X | X | X | X |
| 673 | TBD | Local Emerg. Mgr | TBD | 1 | | X | X | X | | | X | X | X | X | X | X |
| 318 | TBD | Local Fire Cmdr | TBD | 1 | | X | X | X | | | X | X | X | X | X | X |
| 824 | TBD | Local police chief | TBD | 1 | | X | X | X | | | X | X | X | X | X | X |
| 793 | George Doe | Red Cross National | 888-555-8661 | All | | | | | | | | X | | X | | |
| 254 | Jane Doe | Red Cross Coord. | 888-555-5521 | All | | X | | | X | | | X | | X | X | |
| 196 | TBD | Local fire general | TBD | 1 | | | | X | | | X | X | X | X | X | X |
| 513 | TBD | Local police | TBD | 1 | | | | X | | | X | X | X | X | X | X |
| 711 | TBD | Local EMT | TBD | 3 | | | | X | | | X | X | X | X | X | X |

FIG. 4

| Name | Role/Responsibility | Phone No. | On scene or Remote | Network |
|---|---|---|---|---|
| Jane Smith | FEMA Coordinator | 888-555-3498 | Remote | A, B |
| LTG. Lee | Local Nat. Guard | 888-555-3164 | On scene | B, C, D |
| Mayor Forelife | Local Mayor | 888-555-9158 | On scene | B, C |
| James Doe | Local Emerg. Mgr | 888-555-3621 | On scene | B, C, D |
| Fire Marshal Dillon | Local Fire Cmdr | 888-555-4112 | Remote | B, C, D |
| Chief Amongus | Local police chief | 888-555-9354 | Remote | B, C, D |
| Engine 5 | Local fire | 888-555-3776 | On scene | D |
| Sam Smyth | Local police | 888-555-4338 | On scene | D |
| Sam Smith, Jr. | Local EMT | 888-555-8211 | On scene | D |

FIG. 8

DYNAMIC TELEPHONE DIRECTORY FOR WIRELESS HANDSETS

CLAIM OF PRIORITY

The application claims the benefit of priority to U.S. Provisional Patent Application No. 61/058,303 which was filed on Jun. 6, 2008 the entire contents of which is hereby incorporated that by reference.

FIELD OF THE INVENTION

The present invention relates generally to a wireless mobile communication system, and more particularly to methods and systems which provides dynamic telephone directories for wireless mobile devices.

BACKGROUND

The popularity of cellular communication devices has dramatically increased in recent years. As a result most emergency services personnel own or use a cellular telephone or mobile device with cellular communication capability (referred to herein as a "wireless handset") on a daily basis. Thus, cellular telephones and the cellular communication system provide a robust and flexible communication system that can be leveraged by emergency response teams, city and county governments, and regional and national disaster relief and response organizations.

Nevertheless, the cellular communication infrastructure is potentially vulnerable to hurricanes, earthquakes, terrorist strikes and similar events. For example, in the aftermath of hurricane Katrina, emergency personnel responding to the disaster were hobbled by the collapse of the New Orleans cellular communication infrastructure. To address such vulnerabilities, additional cellular communication capacity can be added to a disaster region by activating a deployable cellular communication system to provide emergency response teams and personnel with the ability to wirelessly communicate. Such recently developed deployable units, referred to herein as a "switch on wheels," can include a CDMA2000 base station and switch, Land Mobile Radio (LMR) interoperability equipment, a satellite Fixed Service Satellite (FSS) ground station for remote interconnection to the Internet and PSTN, and, optionally, a source or remote electrical power such as a gasoline or diesel powered generator. A more complete description of an example deployable switch on wheels is provided in U.S. patent application Ser. No. 12/249,143 filed Oct. 10, 2008 which claims the benefit of priority to U.S. Provisional Application No. 60/979,341 filed Oct. 11, 2007, the entire contents of which are hereby incorporated by reference in their entirety.

These switch on wheels are effectively mobile cellular base stations which may be deployed in an incident response area and operated as a cellular tower antenna. The switch on wheels sends and receives communication signals from a plurality of wireless handsets and serves as a gateway portal to the rest of the conventional communications infrastructure including the public switch telephone network (PSTN) and Internet. Communications between the switch on wheels and a wireless handset are broken down into packets for transport as a VOIP communication, and then transmitted via satellite to a ground station outside the disaster area from which the call is forwarded through the telephone network or the Internet to the recipient.

Whether emergency response personnel are communicating using commercial cellular networks or a deployable cellular switch on wheels, they need to know who to call. While organization charts and telephone directors can be useful in normal circumstances, during an emergency situation, determining who is available and nearby can be difficult.

SUMMARY

The various embodiment methods and systems deliver an incident-specific telephone directory to the wireless handsets of emergency response personnel to enable effective and efficient cellular communication during emergency response and disaster relief situations (i.e., incidents). A central database may be maintained with the names and contact information for emergency services personnel as well as federal, regional, and local government agency personnel. When an incident occurs, the central database can be used to generate an incident-specific telephone directory identifying those individuals on-scene as well as individuals in other locations who are also involved in supporting a response to the incident. The incident-specific telephone directory provided to wireless handsets can be configured based on the location of wireless handsets (e.g., those on-scene or nearby), the roles and responsibilities of emergency services personnel, the location of the incident, and the type of incident involved.

BRIEF DESCRIPTION OF THE DRAWINGS

The accompanying drawings, which are incorporated herein and constitute part of this specification, illustrate exemplary embodiments of the invention. Together with the general description given above and the detailed description given below, the drawings serve to explain features of the invention.

FIG. 4 is an example data table suitable for use in a central database of emergency services personnel according to an embodiment.

FIG. 8 is an example data table of a dynamic telephone directory suitable for use in various embodiments.

DETAILED DESCRIPTION

Figure 1:
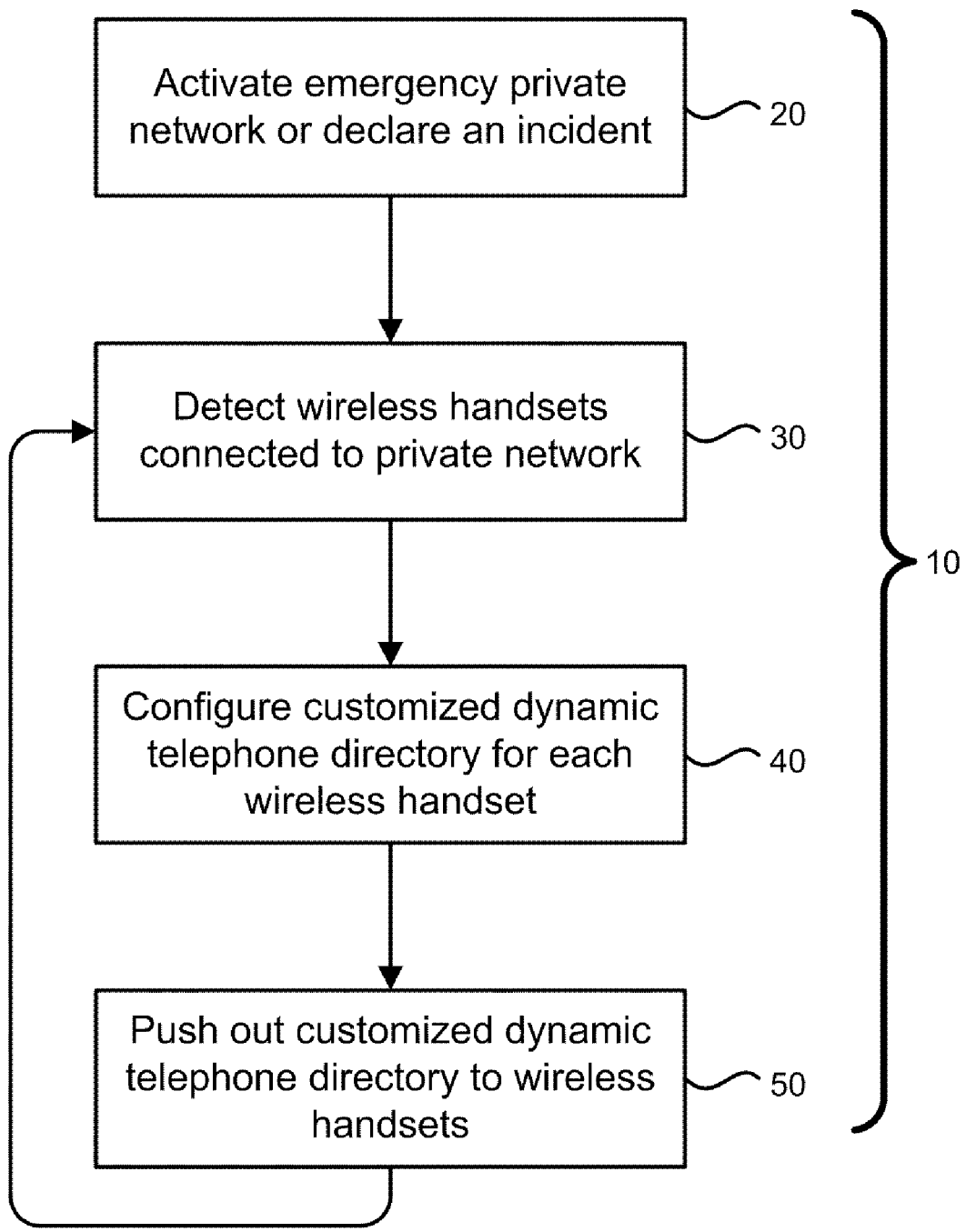
FIG. 1 is a process flow diagram of an embodiment method for deploying dynamic telephone directories to wireless handsets of emergency response personnel.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

As used herein, the terms "wireless handset," "mobile handset," "cellular telephone," "cell phone" and "mobile device" are used interchangeably and refer to any one of various cellular telephones, personal data assistants (PDA's), palm-top computers, laptop computers with wireless modems, wireless electronic mail receivers (e.g., the Blackberry® and Treo® devices), multimedia Internet enabled cellular telephones (e.g., the iPhone®), and similar personal electronic devices. A wireless handset may include a programmable processor and memory which can store an telephone directory data file. In a preferred embodiment, the wireless handset is a cellular handheld device (e.g., a cellphone), which can communicate via a cellular telephone network.

To provide emergency response teams and personnel with the ability to communicate in such situations, deployable cellular communication antennas have been developed. Such deployable units, referred to herein as a "switch on wheels," can include any wireless base station such as CDMA2000/ EVDO, WCDMA, LTE, IS-136, GSM, WiMax, WiFi, AMPS, DECT, TD-SCDMA, or TD-CDMA and switch, Land Mobile Radio (LMR) interoperability equipment, a satellite Fixed Service Satellite (FSS) ground station for remote interconnection to the Internet and the PSTN, and, optionally, a source or remote electrical power such as a gasoline or diesel powered generator. A deployed switch on wheels can support cellular telephone communications for both GSM (Global System for Mobile Communications) and CDMA (code division multiple access) technologies, which are the cellular telephone technologies in widespread use. A more complete description of an example deployable switch on wheels is provided in U.S. patent application Ser. No. 12/249,143 filed Oct. 10, 2008 which claims the benefit of priority to U.S. Provisional Application No. 60/979,341 filed Oct. 11, 2007, the entire contents of which are incorporated by reference above.

A deployable switch on wheels provides first responders with a portal to the conventional communications infrastructure outside the emergency location that remains unaffected by the emergency. Much like a mobile cellular antenna tower, the switch on wheels provides first responders with the ability to utilize their conventional cellular telephones even when the conventional stationary cellular tower antennas have been damaged, destroyed or otherwise disabled. The deployable switch on wheels includes a mobile cellular antenna that can be deployed to act as a temporary cellular tower antenna. The deployable switch on wheels may have a broadcast range approximating that of a conventional cellular tower antenna, can send and receive communication signals to/from a plurality of wireless handsets, and serves as a gateway portal to the rest of the conventional communications infrastructure. When a communication signal is received by the switch on wheels from one of the plurality of wireless handsets, the communication signal may be broken down into data packets for transport as a voice-over-Internet-protocol (VoIP) communication. The VoIP communication signal can be transmitted via a satellite owned by a satellite service provider to a ground station far from the emergency location where the communication can be forwarded through the Internet to the intended call recipient's telephone number. When a call is initiated and intended for one of the plurality of wireless handsets utilizing the switch on wheels as its local base station, the call is routed from the cellular communication network or PSTN from which the call is initiated to the satellite service provider's router via satellite relay to the switch on wheels where the call is ultimately forwarded to the intended wireless handset.

Depending on the magnitude of the disaster situation, multiple switches on wheels may be deployed to the disaster area. Deploying multiple switch on wheels within a region creates an ad hoc wireless communication network which provides first responders with adequate network coverage to effectively utilize their wireless handsets until the commercial cellular communications infrastructure can be returned to service. In long term disaster situations, such as may occur when a coastal region is affected by a major hurricane, the switch on wheels network may remain in place for an extended period of time until conventional communications infrastructure can be repaired or replaced.

The various embodiments function to provide personnel responding to a major homeland security or public safety incident with a dynamic telephone directory delivered automatically to their personal wireless handsets. The dynamic telephone directory provided to wireless handsets can be based on the geographic location of a wireless handset, the roles and responsibilities of the person associated with that wireless handset, and the type of incident involved. The various embodiments automatically transform the wireless handset (e.g., conventional telephones) owned by first responders (e.g., police, fire, ambulance, FEMA, public utilities, etc.), emergency coordinators and government officials into preconfigured incident communicators, with the names and numbers of everyone that they might need to contact while responding to the incident stored in the wireless handset itself. Enabling emergency services personnel to identify who is available on-scene and call them with the touch of a button should help improve interoperable communications during the stress of responding to a significant incident, as well as between first responders and supporting agencies.

In an embodiment the names, numbers, roles and responsibilities and other information for all Federal, State and local emergency services personnel are maintained in a central database 316 (see FIG. 2) coupled to a central database server 314. Individual data records may be grouped or indexed by Federal, State and local agency. They may also be grouped or indexed according to National Response Plan (NRP) incidents and/or preplanned mission assignments; in accordance with regional response plans; and in accordance with the response plans of other organizations and companies that have established emergency response plans and coordinators. This central database 316 can be centrally located and centrally managed through the central database server 314. Preferably the central database 316 is updated regularly to ensure that individual contact records are current. Information may be stored in accordance with standard protocols, such as LDAP, to ensure information can be exchanged with typical first responder directory services and email systems, such as Microsoft Active Directory and Exchange.

During an incident, a central database server 314 coupled to the central database 316 and various communication networks can generate an incident-specific telephone directory for delivery to wireless handsets of selected agency and emergency response personnel containing incident-specific contact information such as the names and phone numbers of all individuals and agencies required to deal with the particular type of incident or location. In addition, the incident-specific telephone directory may contain other contact information such as SMS, EMS, MMS contact addresses, email addresses, etc. When commercial cellular networks are unavailable, an embodiment system may detect which individuals are in the incident area based on their wireless handsets accessing deployed switch on wheels private networks. Upon determining which personnel are on-scene or nearby, an embodiment system can dynamically push to the wireless handsets of responding personnel an incident-specific telephone directory containing the contact information of all emergency response personnel who are on-scene or nearby, as well as agencies available to help deal with the incident. The delivery of incident-specific telephone directors can be accomplished via commercial cellular services as well as deployed switch on wheels private networks provided for emergency services personnel. By automatically providing emergency services personnel with a telephone directory of those on-scene as well as available support services and government agencies, the various embodiments facilitate rapid and effective communications during incidents.

The dynamic telephone directory can be transmitted from a central database server 314 to the client wireless handsets in the incident response area using XML-based Over The Air (OTA) transmissions in accordance with Open Mobile Alliance Data Synchronization (OMA-DS) standards. Wireless handsets of emergency services and government agency personnel may be pre-provisioned with configurations and software to ensure the wireless handsets can communicate with the central database server 314 and deployable switch on wheel, as well as receive and process dynamic telephone directory updates.

A functional overview of the various embodiments is illustrated in FIG. 1. When an incident occurs, which may be determined by activation of an emergency private network, step 20, or designation by an appropriate government agency, the temporary base station within the switch on wheels may detect and identify the active wireless devices of emergency response personnel in the response area and using the private network, step 30. As wireless handsets attempt to access the private network for cellular communications they communicate their identifier information, such as their Electronic Serial Number (ESN) or Mobile Identification Number (MIN), to the network. Computers within the switch on wheels use the wireless handset identifiers (e.g., ESN or MIN) to verify that each wireless handset is authorized to access to the private network. Deployable switch on wheel units have limited capacity and thus are reserved for emergency services personnel responding to the emergency. Identifiers for wireless handsets granted access to the private network, or an identifier for the associated emergency services personnel, can be communicated to a central database server 314 (see FIG. 1). The central database server 314 is informed of the incident type and location, and based upon this information, the central database server 314 selects a prepared response plan, such as a NRP, appropriate to the particular incident and location. Alternatively, emergency management personnel may select the appropriate NRP or other response plan and identify the selection to the central database server 314. Based on the received emergency services personnel identifiers, incident type, location and selected response plan, the central database server 314 compiles a dynamic telephone directory listing contact details for all emergency services personnel on-scene or nearby, as well as government and private resources and organizations available to deal with that incident, step 40. Once the dynamic telephone directory is compiled, a Server Alerted Synchronization Notification procedure (or other mechanism for communicating with mobile devices) is used to instruct all wireless handsets connected to the network in the response area (or all wireless handsets listed in the dynamic telephone directory) to establish a data communication session back to the central database server 314. As each wireless handset establishes a session with the central database server 314, WBXML messaging can be used to send the incident-specific dynamic telephone directory out to the appropriate wireless handsets, step 50. Since other emergency services personnel may arrive on-scene, the embodiment system may continue to detect other wireless handsets connecting to the private network, repeating step 30. As new personnel arrive on-scene with their wireless handsets, the embodiment system may update the dynamic telephone directory, repeating step 40, and push out the updated directory to new arrivals, repeating step 50, as well as periodically sending out an updated dynamic telephone directory to wireless handsets of all personnel involved in the incident response. This process can continue until the incident response is terminated.

Figure 2:
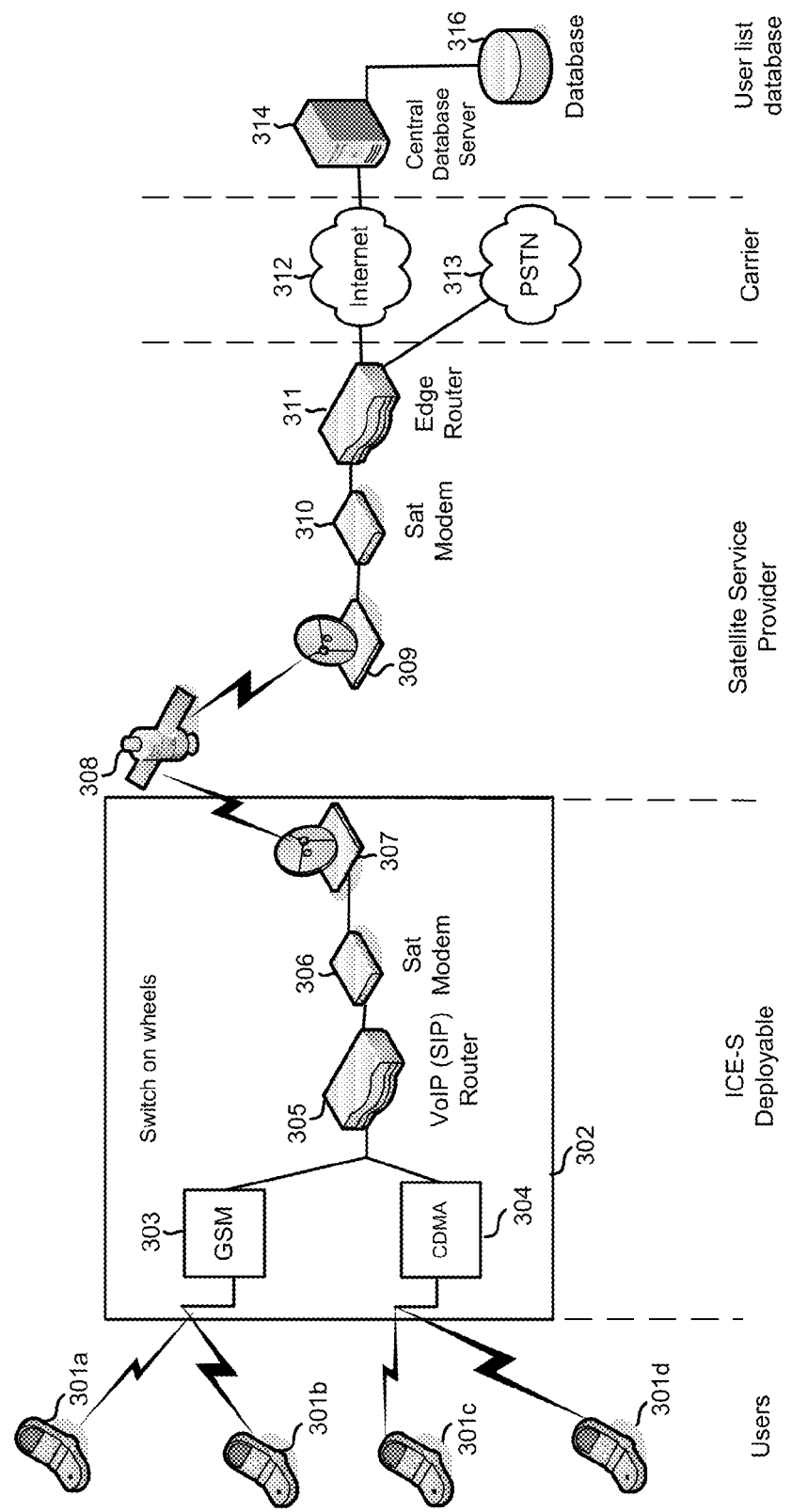
FIG. 2 is a communication system component diagram of an emergency cellular communication system operating on a deployable wireless base station.

FIG. 2 illustrates a private communication network that may be established in an emergency situation using a deployable switch on wheels 302. A switch on wheels 302 deployed at an emergency response site may support cellular communications with plurality of conventional wireless handsets 301a-301d within communication range. For purpose of illustration, wireless handsets 301a and 301b are illustrated as GSM devices which communicate with a GSM transceiver 303 within the switch on wheels 302, while wireless handsets 301c and 301d are CDMA devices which communicate with a CDMA transceiver 304 within the switch on wheels 302. Being owned by emergency services personnel, the wireless handsets 301a-301d may be provisioned with the system identification number (SID) of the switch on wheels network 302, so the SID will appear in the primary preferred roaming list (PRL) system table of these authorized wireless handsets. Additionally, the identification numbers assigned to emergency services personnel wireless handsets 301a-301d, such as the Electronic Serial Number (ESN) or Mobile Identification Number (MIN), will be known to the switch on wheels 302 by being stored in a database maintained within the switch on wheels or in a database to which the switch on wheels 302 has a communication link. So provisioned, the wireless handsets 301a-301d can access and will be immediately recognized by the switch on wheels 302 to send and receive voice and data signals via the switch on wheels 302 private network. Consequently, if an emergency situation develops and the switch on wheels 302 is deployed, wireless handsets 301a-301d will be able to access the private network provided by the switch on wheels 302 in a roaming mode. In this manner, the emergency services personnel who own the wireless handsets 301a-301d will be provided with full communication capabilities in an emergency situation where a switch on wheels 302 has been deployed.

As shown in FIG. 2, wireless handsets 301a-301d communicate with either a GSM transceiver 303 or a CDMA transceiver 304 located within the deployable switch on wheels 302. The communication signals received from the GSM transceiver 303 and CDMA transceiver 304 are sent to a VoIP Router 305 located within the switch on wheels 302 to convert the communication signals into IP packets capable of being transmitted over the Internet. As part of the communication signals received by the deployable switch on wheels 302, location coordinates derived from either handset provided geodetic information or the location of the switch on wheels, as well as wireless handset phone number data, may be transmitted with the communication signal.

The signals from the VoIP router 305 are sent to a satellite system router 306, such as an iDirect unit, as IP packets. The satellite routed IP packets are relayed to a satellite uplink unit 307 where the IP packets are transmitted to a geosynchronous communication satellite 308. The satellite uplink unit 307 may include a satellite signal transceiver coupled to a deployable satellite communication antenna. The IP packets are relayed by the satellite 308 to a satellite downlink 309 such as maintained by a satellite service provider. The received IP packets are received by the satellite router 310 located in the satellite service provider facility and routed to an Edge Router 311. The Edge Router 311 routes communications to their intended destination via the Internet 312 or the public switched telephone network (PSTN) 313. For communications addressed to the central database server 314, the edge router 311 will route such communications via the Internet 312 to the IP address of the central database server 314. The central database server 314 may be connected to a central database 316, such as a large data repository disk drive, by a direct cable connection or a local area network.

In a similar manner, the central database server 314 can communicate with the wireless handsets 301a-301d by routing messages via the Internet 312 to the edge router 311 which ensures that the messages are router via the satellite 308 to the switch on wheels 302 for broadcast to the individual wireless handsets 301a-301d. Thus, using the network illustrated in FIG. 2 wireless handsets 301a-301d can initiate a data communication session with the central database server 314 via the switch on wheels 302 and satellite service provider (308-311) to a distant connection to the Internet 312. Similarly, the central database server 314 can accept that connection and communicate via the satellite service provider and switch on wheels 302 to download the dynamic telephone directory to each wireless handset with which it has an established communication connection.

Figure 3:
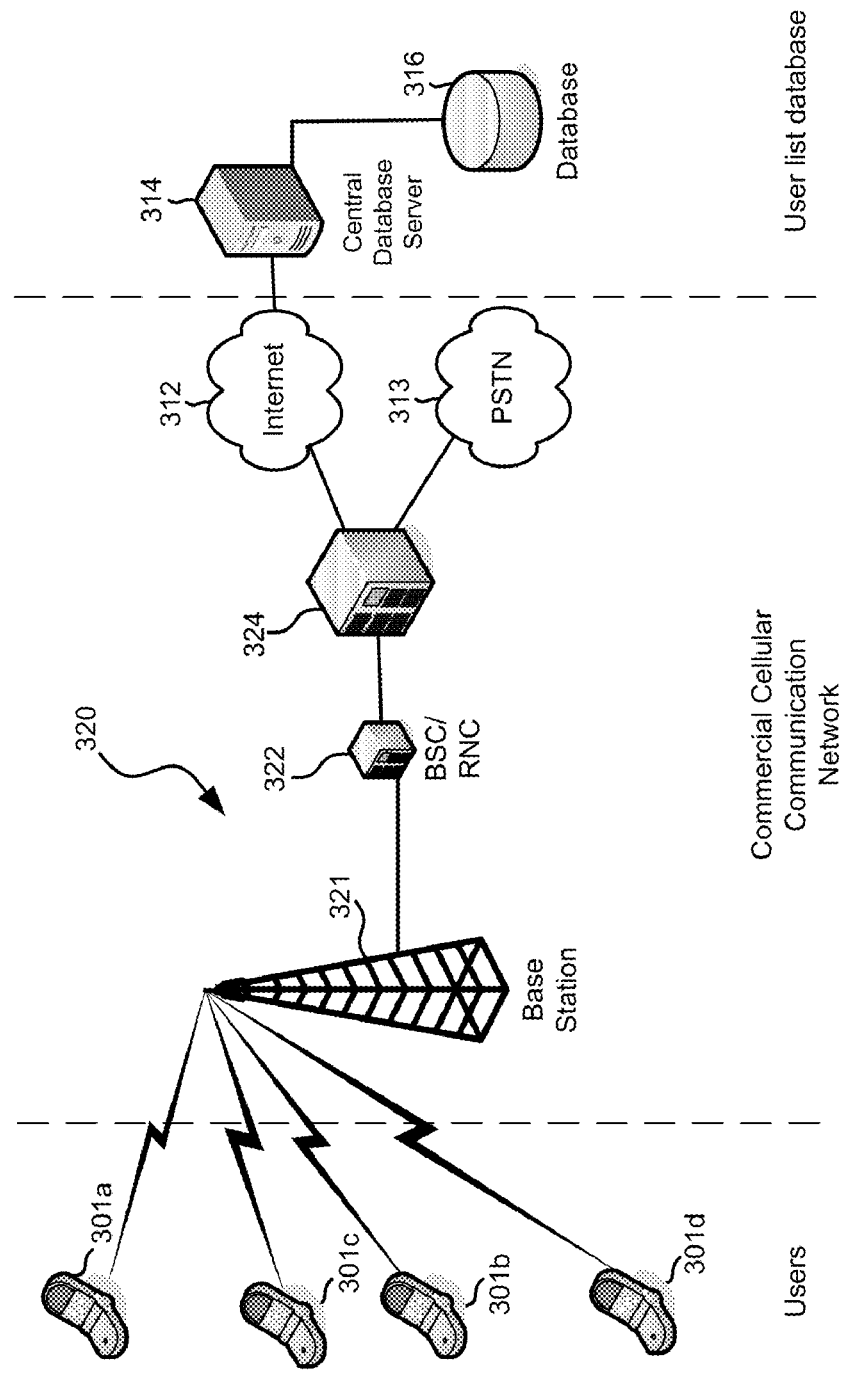
FIG. 3 is a communication system component diagram of a cellular communication network including a central database server and database according to an embodiment.

While the embodiments are of great usefulness when a major disaster strikes that requires the deployment of a deployable switch on wheels, and the various embodiments may also be of utility in less significant incidents where commercial cellular communications remain available. In such situations, emergency services personnel may rely upon their wireless handsets for communications making use of the robust nature of the commercial cellular communications infrastructure. Nevertheless, emergency services personnel would benefit from having an incident-specific telephone directory to enable them to contact other personnel in the vicinity as well as government agencies and entities who can provide support. In such situations, the wireless handsets of emergency services personnel can access the central database server 314 using the commercial cellular network 320 as illustrated in FIG. 3. With commercial cellular communications available, wireless handsets 301a-301d will communicate with the nearest cellular telephone base station antenna 321. The base station 321 connects via a base station controller (BSC)/radio network controller (RNC) 322 to a Mobile Switching Center (MSC) 324. The MSC 324 contains both a public switched telephone network (PSTN) interface for connecting to the PSTN 313, and an Internet interface for connecting to the Internet 312. Calls made to and from any of the multiple wireless handsets 301a-301 may be routed via conventional landlines over the PSTN 313 or Internet 312 using VoIP. Communications between the wireless handsets 301a-301 and the central database server 314 may be accomplished via the commercial cellular telephone network 320 and the Internet 312.

To enable the various embodiments, a central database 316 of emergency service personnel contact information is provided, such as in a central location. This central database 316 may be of any conventional database design, such as in the form of a data table illustrated in FIG. 4 for comprising numerous data records (illustrated as rows) made up of several data fields (illustrated as columns). For example, each data record may be associated with a single individual and include data fields for storing information regarding the individual, such as: a unique ID (e.g., the ESN or at MIN of the individual's wireless handset, or another identify linked to the wireless handset); name (e.g. last name, first name, middle initial and title); role/responsibility (e.g., job title, rank or grade, assignment or responsibility, etc.); agency or organization (not shown); wireless handset telephone number; regional responsibility or jurisdiction; communication network access designations (which may be useful in situations where an emergency response includes establishing a number of restricted communication networks); contact lists (which may be used to identify groups of individuals that need to be included within telephone directories); national response plans (NRP) for which they need to be included in a telephone directory; and other information which may be useful for the purpose of generating incident-specific telephone directories. In addition, data records may contain other contact information such as SMS, EMS, MMS contact addresses, email addresses, etc. not shown in FIG. 4. To facilitate generation of incident-specific telephone directories, the central database 316 may be indexed according to a variety of data fields. For example, the individual ID may serve as a primary key to the records to enable the database to find the individual data records when an individual ID is provided, such as by the deployable switch on wheels as described herein. As another example, the data records may be indexed based on agency, communication networks, contact lists, NRP, and name. Using such indices, telephone directories can be quickly assembled based on and sorted by any of the data are contained within the database.

Figure 9:
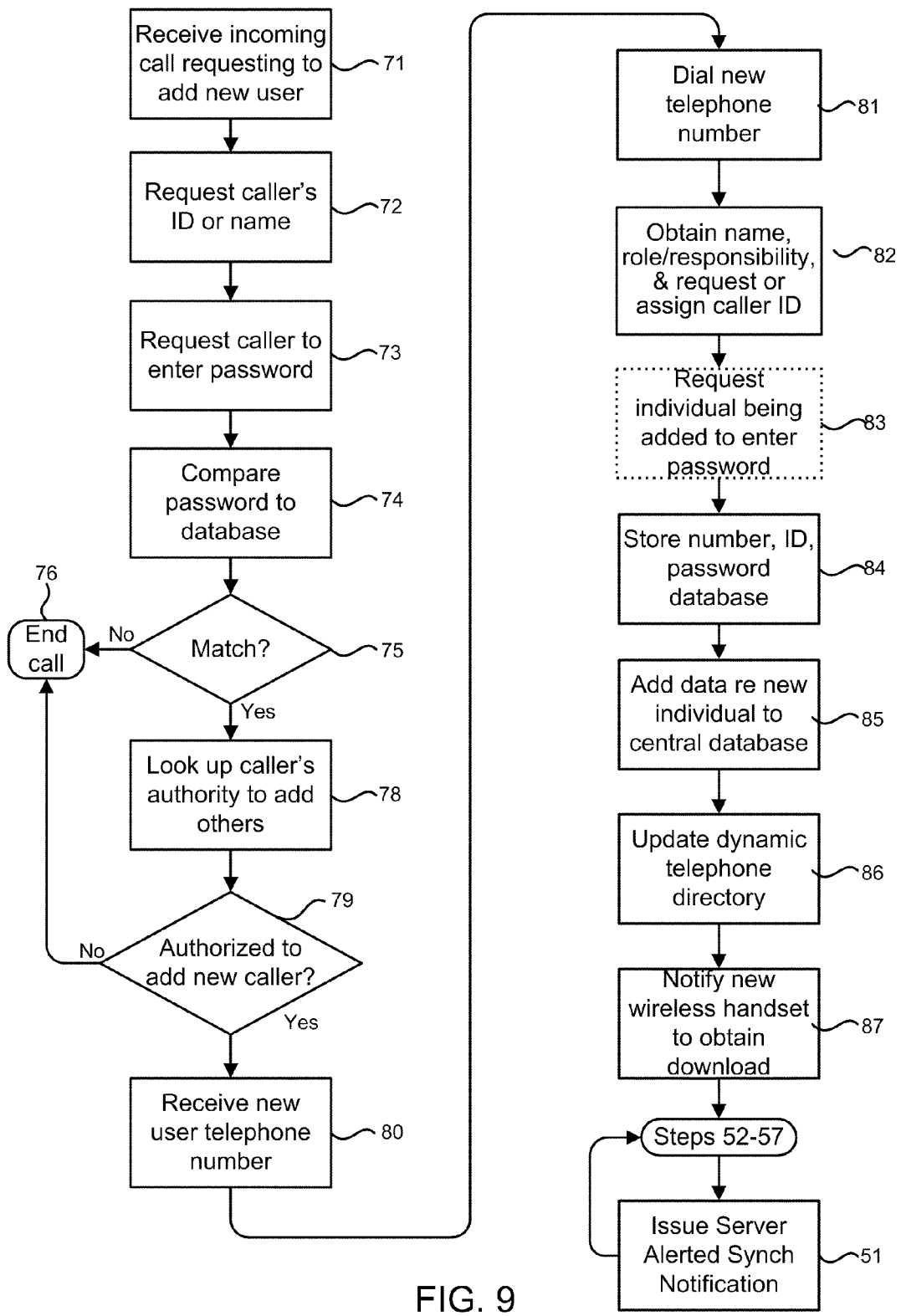
FIG. 9 is a process flow diagram of example steps that may be implemented to provide the dynamic telephone directory to new emergency services personnel added to their response team during an incident.

In an embodiment, every emergency services personnel within the United States may be included within the central database 316, with this information updated on a regular basis. However, in another embodiment, only a portion of the emergency services personnel are maintained within the central database 316, while data records are included for individuals that should be included in certain incident-specific telephone directories even though the specific individual is not yet known. For example, the central database 316 may include a placeholder record for the state governor as illustrated in record ID 382 so that the governor's role, responsibilities, networks, contact lists and response plan participation can be identified in advance even though governors change with each election and an emergency situation may arise in any state. Similarly, placeholder records may be provided for local mayors, emergency managers, fire commanders, local police, local fire, and local emergency medical technicians (EMT) personnel. When an incident occurs, operators may be able to quickly identify the local individuals who will fill the role for which placeholder records are provided and quickly include that information within the central database 316. Also, as an incident response proceeds, individuals may be added to the telephone directory such as by implementing methods described below with reference to FIG. 9. As individuals are added whose role or responsibility matches a particular placeholder record, their information may be added into the appropriate data fields within the placeholder record.

The central database 316 and the associated central database server 314 may be located anywhere in the country, such as in any National Operations Center (NOC). Multiple copies of the central database 316 may be maintained in various locations around the country to ensure its availability in the time of crisis. Additionally, a copy of the central database 316 may be provided within servers included within the deployable switch on wheels 302 so that the switch on wheels is capable of generating the incident-specific telephone directory itself without having to reach out to the central database server 314. Thus, in an embodiment, the functionality described herein as being performed within the central database server 314 can be performed by a server included within the switch on wheels 302.

Figure 5:
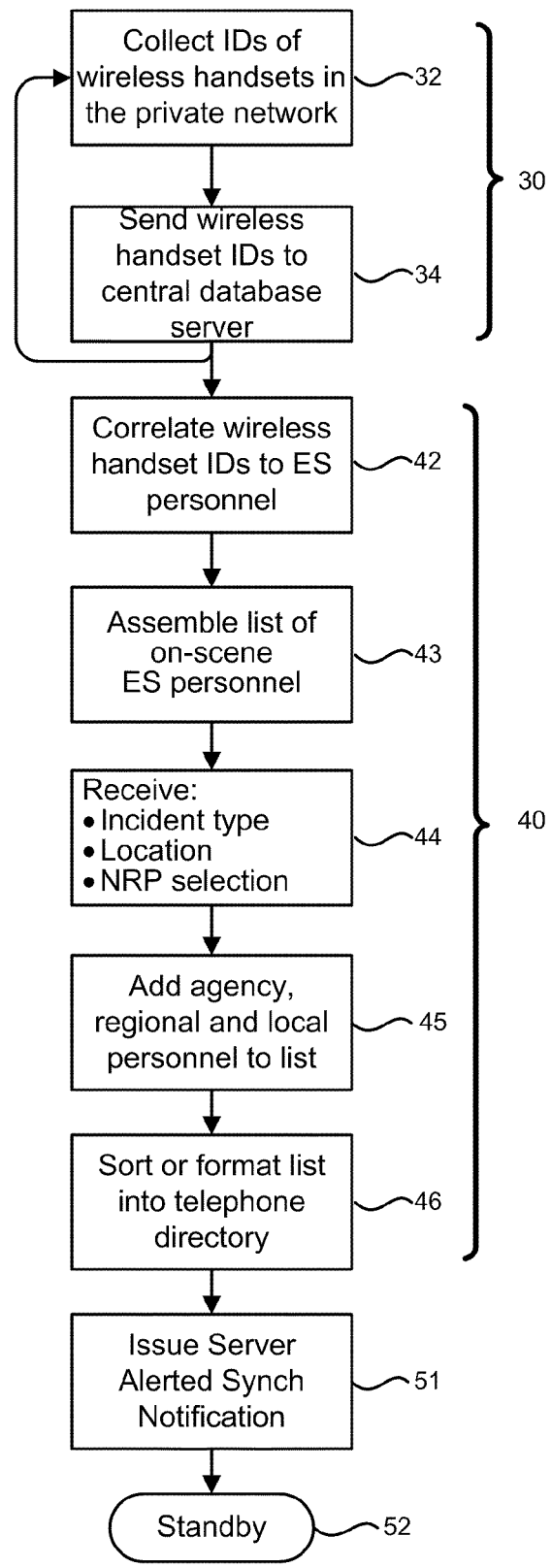
FIG. 5 is a process flow diagram of example steps that may be implemented in a central database server to accomplish steps 30 and 40 illustrated in FIG. 1.

Further details regarding the generation of an incident-specific telephone directory are illustrated in FIG. 5. When a deployable switch on wheels 302 is activated in an emergency situation, nearby wireless handsets owned by emergency service personnel will begin to access the private cellular communication network. This can occur automatically as emergency service personnel wireless handsets may be provisioned with the SID and frequency channels of the deployable switch on wheels 302 so that when they detect the SID and frequencies, the wireless handsets attempt to access the network in roaming mode. As described above, access to the private cellular network is granted if the switch on wheels 302 recognizes the wireless handset's ID (e.g., ESN or MIN). As wireless handsets login to the private cellular network, the deployable switch on wheels 302 collects the wireless handset IDs, step 32. After a sufficient number of wireless handset IDs have been collected, the deployable switch on wheels 302 transmits a list of the IDs to the central database server 314, step 34. This information may be transmitted to the central database server 314 via a communications satellite 308 for relay to the Internet 312.

Upon receiving the wireless handset IDs for the wireless handsets logged in to the private network provided by the deployable switch on wheels 302, the central database server 314 can begin to assemble a incident-specific telephone directory, step 40. To do so, the central database server 314 may correlate the wireless handset IDs to emergency service personnel data records within the central database 316, step 42. In doing so, the central database server 314 may access each of the corresponding individual data records, and using that information assemble a list of the on scene emergency service personnel, step 43. This list may include name, telephone number, incident response roles and responsibilities, and other information that may be useful to those responding to the particular incident. Such additional information may also include addresses for SMS, EMS, MMS, electronic mail, etc. As part of this process, either before, during or after assembling the list of on-scene emergency service personnel, the central database server may receive information regarding the type of incident, its location, and any NRP or local response plan, step 44. Such information may be provided by an operator connected to the central database server 314, or by a national, regional or local emergency response agency logged into the central database server 314. In an embodiment, the central database server 314 may be configured with software to determine automatically the location and appropriate NRP based upon the information automatically provided by the deployed switch on wheels.

Using information regarding the incident type, location and a selected response plan, the central database server 314 can add appropriate individuals from agencies, local governments and aid organizations to the list of on-scene emergency service personnel, step 45. The individuals added to the list at this stage may be selected based upon information contained in their respective data records within the central database 316, such as their region or location, roll or responsibility, contact lists or NRP participation. For example, to assemble this portion of the list, the central database 316 may be searched to identify all individuals whose data records indicate they should participate in an incident of the particular type, particular location, and selected NRP or local response plan. As mentioned above, such searching may be aided by indexing the central database 316 for each of these various data fields.

With the list of individuals assembled, the central database 316 may sort, organize or otherwise format the list into a telephone directory suitable for delivery to wireless handsets, step 46. In doing so, the central database 316 may use established protocols, such as LDAP (Lightweight Directory Access Protocol) which is a software protocol enabling anyone to locate organizations, individuals, and other resources (such as files and devices) in a network, including the public Internet. Additionally, the central database server 314 may organize the telephone directory entries so that they are compatible with phonebook applications implemented on the various wireless handsets. Also, the telephone directory may be organized in a manner to facilitate its use by emergency service personnel who are likely to know the name of the agency they need to contact but not the name of the individual.

Finally, with the telephone directory ready for transmission, the central database server 314 may issue a server alerted synchronization notification, step 51, which informs wireless handsets that they need to establish a data communication session with the central database server 314 which will enable the central data server 314 to transmit the telephone directory. Instead of a server alerted synchronization notification, the central database server 314 may notify wireless handsets of the availability of the telephone directory using other methods for communicating with a large number of wireless handsets simultaneously, such as broadcast message, SMS message, and e-mail message. Once that notification is transmitted, the central database server 314 may stand by to establish sessions with each wireless handset as it is contacted, step 52.

Figure 6:
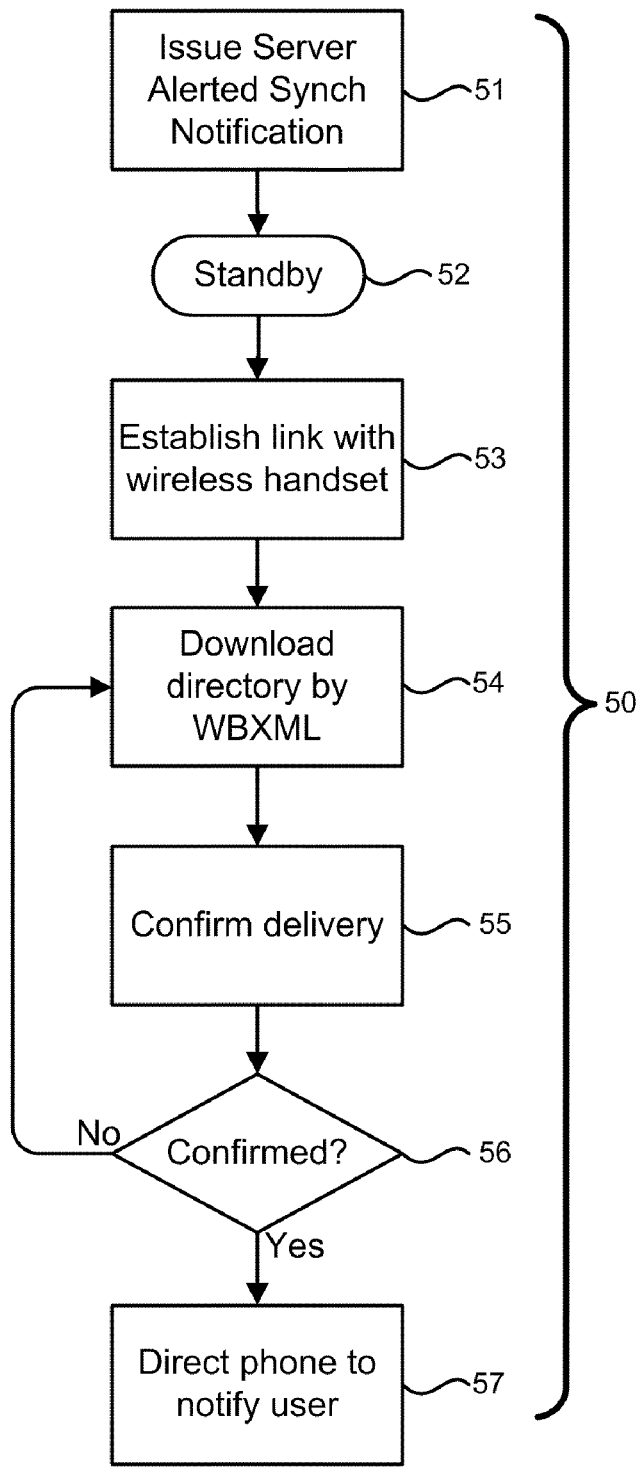
FIG. 6 is a process flow diagram of example steps that may be implemented in a central database server to accomplish step 50 illustrated in FIG. 1.

Further details regarding the delivery of incident-specific telephone directories to individual wireless handsets, step 50, are illustrated in FIG. 6. As mentioned above, when the central database server 314 is ready to transmit the incident-specific telephone directory it may issue a server alerted synchronization notification or other means of notifying wireless handsets, step 51, and standby to receive data communication session connections from wireless handsets, step 52. As each wireless handset requests a data communication session with the central database server 314, the central database server 314 can establish a link with the requesting wireless handset, step 53. Using that established connection, the central database server 314 can download the telephone directory to the connected wireless handset using XML-based Over The Air (OTA) transmissions in accordance with the open mobile alliance data synchronization (OMA-DS) standards. The telephone directory transmission will be in the form of wireless binary XML (WBXML). As part of the transmission, the central database server 314 may request the wireless handset to confirm that the directory was fully and accurately transmitted, such as by confirming error detection values, step 55. If the wireless handset does not confirm that the telephone directory was accurately delivered (i.e., test 56="No"), the central database server 314 may retransmit the directory, repeating step 54. If the wireless handset does confirm that the telephone directory was accurately delivered (i.e., test 56="Yes"), the central database server 314 may direct the wireless handset to notify the user that the new telephone directory is available for use, step 57, before terminating the session.

Figure 7A:
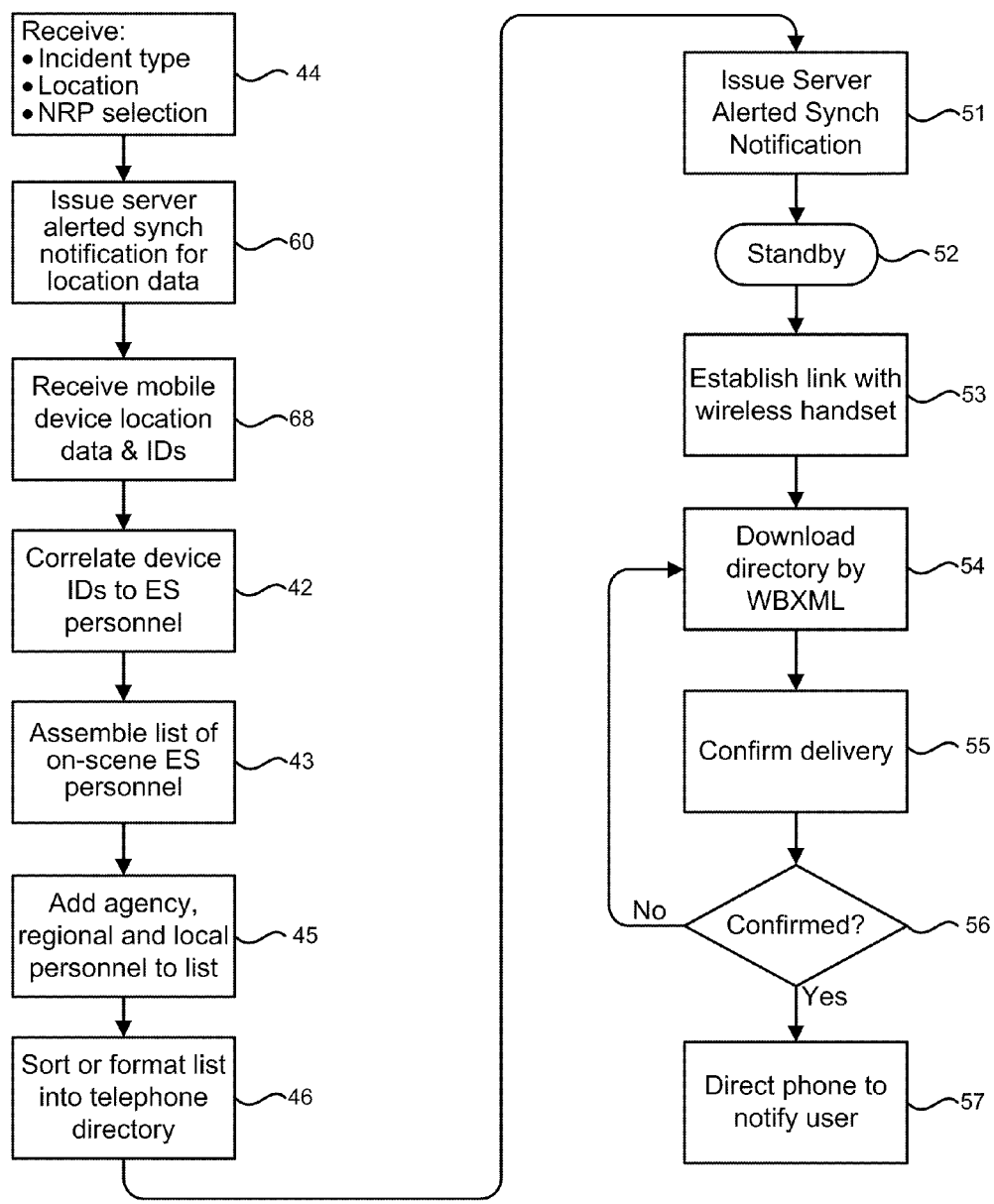
FIG. 7A is a process flow diagram of example steps that may be implemented in a central database server according to an alternative embodiment.

The various embodiments are not limited to emergency events which do not disable commercial cellular networks, and thus do not require activation of deployable switch on wheels private networks. In an embodiment, the wireless handsets of emergency response personnel may be configured to report their locations to the central database server 314 to enable the generation of incident-specific telephone directories when communications is via commercial cellular networks as described above with reference to FIG. 3. Example operational steps performed by the central database server 314 in this embodiment are illustrated in FIG. 7A.

Since the incidents for which this embodiment is intended may not lead to activation of a switch on wheels private network, the central database server may be informed of the incident by an operator action at the outset, step 44. In one implementation, local cellular networks may be configured to collect the wireless handset IDs from emergency services personnel and report this information to the central database server when a local incident is declared (e.g., by FEMA, HAS, etc.), thereby implementing a commercial version of step 32 described above with reference to FIG. 5. In another implementation, the wireless handsets may be directed to report their own positions to the central database server 314 by the central database server 314 transmitting a server alerted synchronization notification, step 60. This message may request all emergency services personnel wireless handsets to establish a connection to the central database server 314 through which the central data server may request each connected wireless handset to report its current location. Alternatively, the central database server alerted synchronization notification may include a location, such as in the form of geographic coordinates, and request that all emergency services personnel wireless handsets within a defined or preset radius of the location establish a connection to the central database server. As a third alternative, the central database server alerted synchronization notification may direct emergency services personnel wireless handsets to determine their positions and to report this information to the central database server by another communication means, such as, for example, electronic mail, SMS message, or an HTTP Post command message sent in an TCP/IP transmission to the server's IP address. Further, instead of a server alerted synchronization notification, the central database server may request the location information from wireless handsets by sending each an electronic message, such as an SMS or e-mail message that can be received and processed by the wireless handset. Each of these alternatives, as well as any other location solicitation messages that can be sent to wireless handsets, are encompassed within step 60 in FIG. 7A. Once the central database server 314 receives the location data and ID from each emergency services personnel wireless handset, step 68, the central database server 314 may configure the incident-specific telephone directory by completing steps 42-46 (collectively step 40) described above with reference to FIG. 5. Similarly, the central database server 314 may issue the server alerted synchronization notification, step 51, and enter a standby state, step 52, as described above with reference to FIGS. 5 and 6 above. Then as wireless handsets establish a communication session, the central database server 314 may push out the telephone directory to the wireless handsets completing steps 53-57 described above with reference to FIG. 6.

Figure 11:
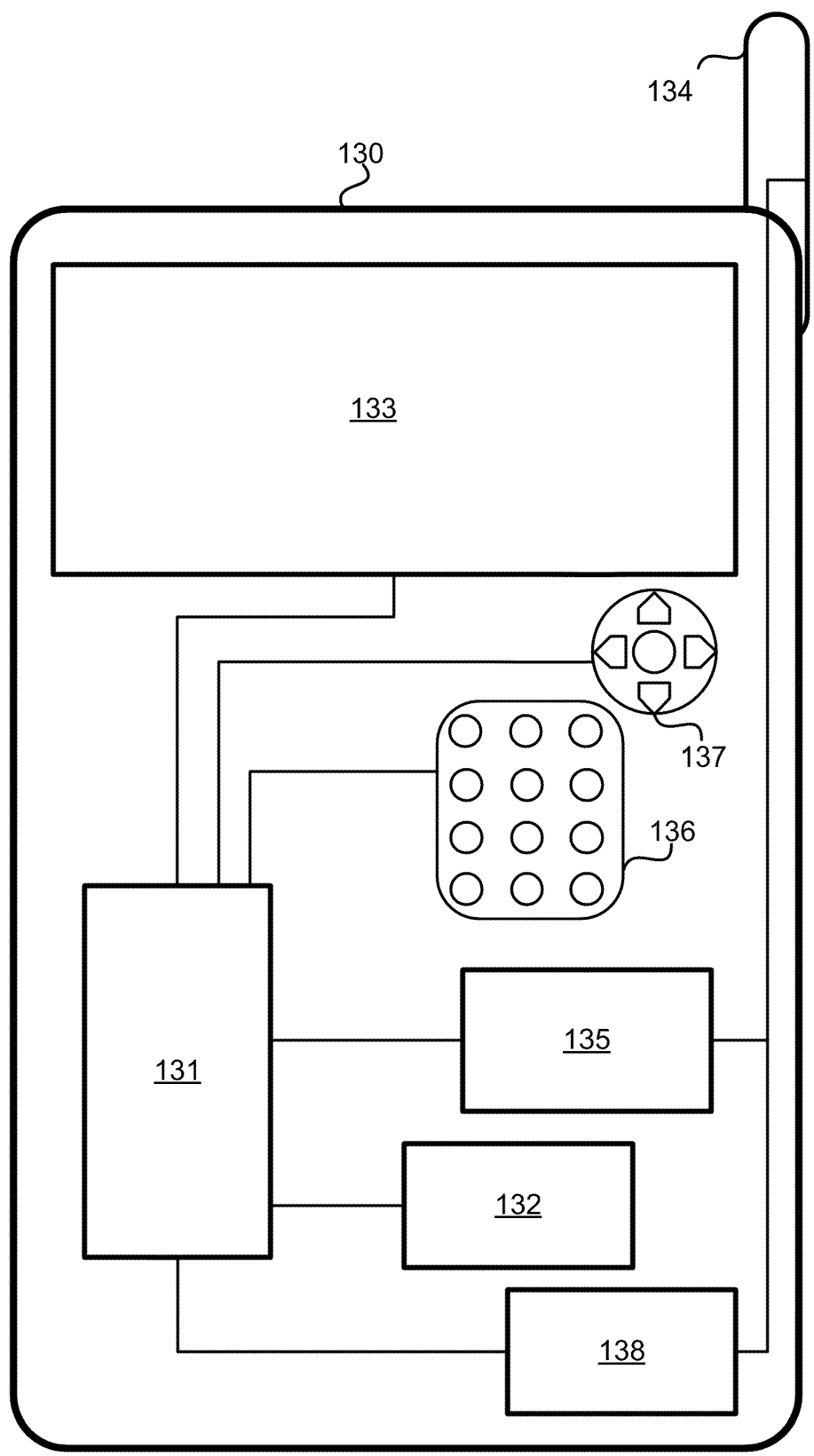
FIG. 11 is a component block diagram of an example wireless handset suitable for use with the various embodiments.

Most state-of-the-art wireless handsets include global positioning system (GPS) receivers 138 (see FIG. 11) within their system circuitry. GPS equipped wireless handsets can obtain their exact coordinates whenever they can receive signals from at least three GPS satellites. Thus, such wireless handsets can be configured with software instructions to quickly determine their location upon receiving a server alerted synchronization notification and report this information to the central database server 314. Wireless handsets may also report their location determined by GPS receivers to the local cellular communication network, such as is utilized in some 911 emergency call systems. Wireless handsets which do not include embedded GPS receivers 138 may determine their location using information provided by the cellular communication network. Base station antennas 321 transmit an identifier to wireless handsets which can be used to determine the location of each individual wireless handset as being within communication range of the antenna. Also, cellular communication networks can determine the location of wireless handsets as being within the communication range of a particular base station antenna, as well as by triangulation using signals received from three or more base station antennas.

Figure 7B:
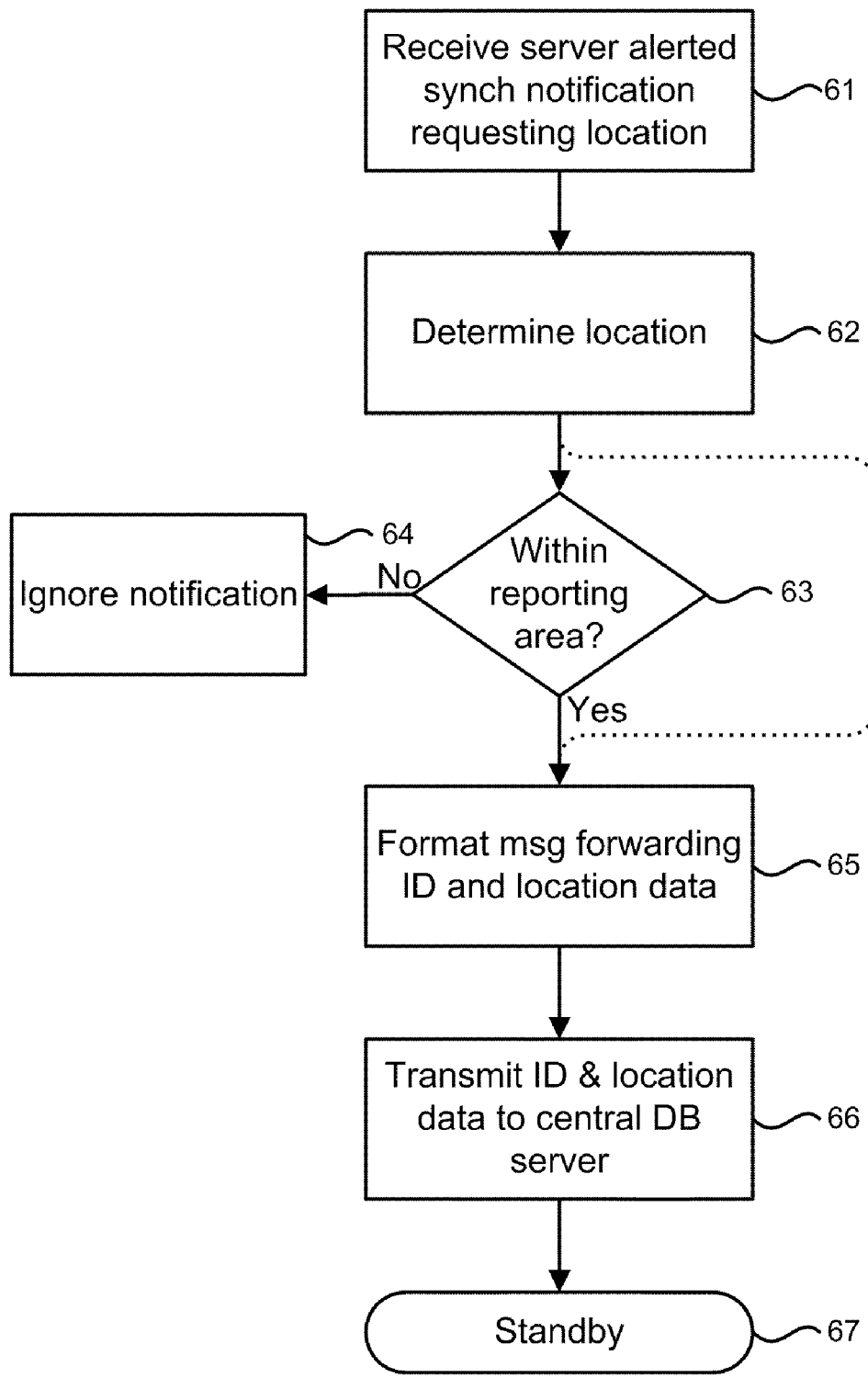
FIG. 7B is a process flow diagram of example steps that may be implemented in a wireless handsets support the steps illustrated in FIG. 7A.

Wireless handsets can be configured with processor-executable software instructions to cooperate with central database server requests for information, such as by implementing steps like those illustrated in FIG. 7B. Upon receiving a server alerted synchronization notification message, or other message requesting that the wireless handset to report its location, step 61, the wireless handset processor 131 (see FIG. 11) may determine its location using a GPS receiver 138 or by other mechanisms described above, step 62. The wireless handset may be configured to receive the location request from the central database server, step 61, in a number of different formats, including broadcast message, electronic e-mail, SMS message, and a server alerted synchronization notification. The wireless handset processor 131 may also be configured with software to receive location coordinates in the server alerted synchronization notification (or similar message) and compare the determined location (step 62) to the received location coordinates to determine whether the wireless handset is within an area in which wireless handsets should report their location to the central database server, referred to herein as a "reporting area," test 63. The reporting area may be determined based upon the received location coordinates plus a radius that may be predefined in software or included within the server alerted synchronization notification message. For example, the processor 131 may be configured with software instructions to determine that it is within the reporting area if its determined location is within 100 miles of the received location coordinates. As another example, the server alerted synchronization notification message may include both location coordinates and a distance from those coordinates (e.g., 50 miles) within which the wireless handset should report its location. The processor 131 may be configured to ignore notification messages, step 64, when the determined location is not within the reporting area (i.e., test 63="No"). If the processor 131 determines that its location is within the reporting area (i.e., test 63="Yes"), the processor 131 may format a message which includes its identifier (ID) and its determined location data, step 65. This message then may be transmitted to the central database server 314, step 66. Any of a variety of transmission methods may be used for transmitting the wireless handset ID and location data, including: establishing a connection to the central database server 314 and transferring the information during a data communication session; transmitting the information as an e-mail or SMS message to the address of the central database server 314; and transmitting a HTTP post command in a TCP/IP message sent to the IP address of the central database server 314. After transmitting the ID and location data to the central database server 314, the wireless handset may then stand by, step 67, to receive further instructions from the central database server, such as a server alerted synchronization notification signaling that it should establish a session with the central database server 314.

The incident-specific telephone directory may be formatted in the form of a data table that can be implemented on the telephone directories of emergency services personnel wireless handsets. An example of such a data table is illustrated in FIG. 8. Such data table may include data fields for storing the name of each contact, a data field for identifying the role responsibility of the contact, a data field for the telephone number for the contact, and data fields to identify other information regarding the contact. For example, the telephone directory may include a data field which indicates whether the individual is on-scene or at a remote location, such as in Washington, D.C. or the state capital. This information may be of great use to emergency services personnel who are looking for others on-scene who can help with an urgent situation, or need to contact someone outside the emergency response area to obtain outside assistance. Additionally, the incident specific telephone directory may include information regarding the communication networks or other communication organization to which the individual has access. Such information may be useful in determining how best to connect with that particular individual when communication resources are stretched thin. In addition, the incident-specific telephone directory may contain other contact information such as SMS, EMS, MMS contact addresses, email addresses, etc. not shown in FIG. 8. As mentioned above, the incident-specific telephone directory data structure will preferably be configured so that it is compatible with the data structure of each wireless handset's phone directory application. Thus, the data structure illustrated in FIG. 8 is for example purposes only.

During their response to a major incident, it is likely that individuals with useful skills or qualifications, such as doctors, plumbers, security guards, etc. may be deputized to join the response effort. Since most individuals own their own wireless handset, they can easily be added to the incident response communication network, particularly if the commercial cellular telephone network is available. Wireless handsets of newly deputized response team members can be provisioned to access the private network of a switch on wheels using well-known provisioning techniques. To add new response team members to the incident-specific telephone directory, steps such as those illustrated in FIG. 9 may be implemented. Care should be exercised to ensure that only actual members of the response team are added to the telephone directory in order to avoid confusion and misdirected communications. One method for controlling the addition of individuals to the telephone directory is to require someone who is an existing member of the response team or otherwise authorized to add individuals to the response team to initiate the process. This may be initiated by an authorized person calling or sending a data call to the central database server requesting to add a new user, step 71. This may be a telephone call directed to an operator coupled to the central database server 314 (the telephone number for this operator could be included within the incident-specific telephone directory). Alternatively, this request may be submitted in the form of an e-mail or SMS message addressed to an operator or to the central database server itself.

Upon receiving such a telephone or data call, the caller identification and/or name may be requested, step 72, and, optionally, the caller may be asked to enter a password to verify himself/herself, step 73. The central database server 314 may look up the caller's name in the central database 316 in order to obtain the authorized individual's password data to compare it to the password provided by the requester, step 74. If the provided password does not match the password stored in the individual's database record (i.e. test 75="No"), the operator or the central database server may simply end the call, step 76, as the individual is not authorized to add others to the contact list. Alternatively, in a step not shown in FIG. 9, the operator or central database server may repeatedly request the caller to provide the password information until the correct password is received. However, if the provided password matches the password stored in a database (i.e. test 75="yes"), the central database server 314 may check whether the caller is authorized to add others to the telephone directory, such as by checking the caller's authorization stored within the caller's data record stored in the central database, step 78. Alternatively, the caller's authority to add others to the telephone directory may be provided in another database or based upon the individuals rule, responsibility, title, rank or grade which may be stored in a central database 316. If the caller is not authorized to add others to the telephone directory (i.e., test 79="No"), the operator or the central database server may simply end the call, step 76. If the caller's identification is confirmed and the caller is authorized to add a new member to the response team telephone directory (i.e. test 75 and test 79="Yes"), the caller may be requested to say or enter the new user's mobile device telephone number, step 80. At this point, the voice or data communication connection to the caller may be ended.

As an alternative to receiving a telephone call, step 71, individuals may access the central database server 314 via the Internet in order to provide such information in response to a data entry webpage. In this alternative, the individual provides their name, ID, password and the telephone number of the deputized wireless handset to be added in response to data entry prompts within the website. The central database server 314 can then use the entered data to verify the individual in a manner substantially the same as that described above.

Once the new telephone number has been provided, step 80, the operator or the central database server 314 may dial the provided telephone number, step 81, in order to speak with the person being added to the response team and/or the telephone directory. When a telephone connection is established to the individual being added, the operator or central database server 314 may request the individual to provide their name, title, role, responsibility and identifier, step 82. This information may be provided by a voice, such as using voice recognition, or key entry. Optionally, the individual being added may also be requested to enter a password, step 83, such as by speaking the password or entering it using key entry. The received information may then be stored in the central database, step 85. This information may be stored in a temporary record which will be deleted after the present incident is terminated, or maybe stored permanently, such as when the individual is identified as a permanent emergency services provider. Using the updated central database, the central database server 314 may then update the incident-specific telephone directory, step 86, such as by adding the new individual to the directory and resorting or reformatting the directory by re-performing step 46 described above with reference to FIG. 5. The central database server 314 may notify the wireless handset of the newly added individual of a need to establish a data communication session with the central database server in order to receive a download of the incident-specific telephone directory, step 87. This notification may be by electronic mail, and SMS message, or a server alerted synchronization notification as described in more detail above. The central database server then may perform steps 52-57 described above with reference to FIG. 6 to download the telephone directory to use the newly added wireless handset. Finally, the central database server 314 may notify all wireless handsets involved in the incident response that a new incident-specific telephone directory is available for download, such as by issuing a server alerted synchronization notification, step 51. The updated incident-specific telephone directory is then downloaded to all wireless handsets by the central database server 314 repeating the steps 52-57 described above with reference to FIG. 6.

Figure 10:
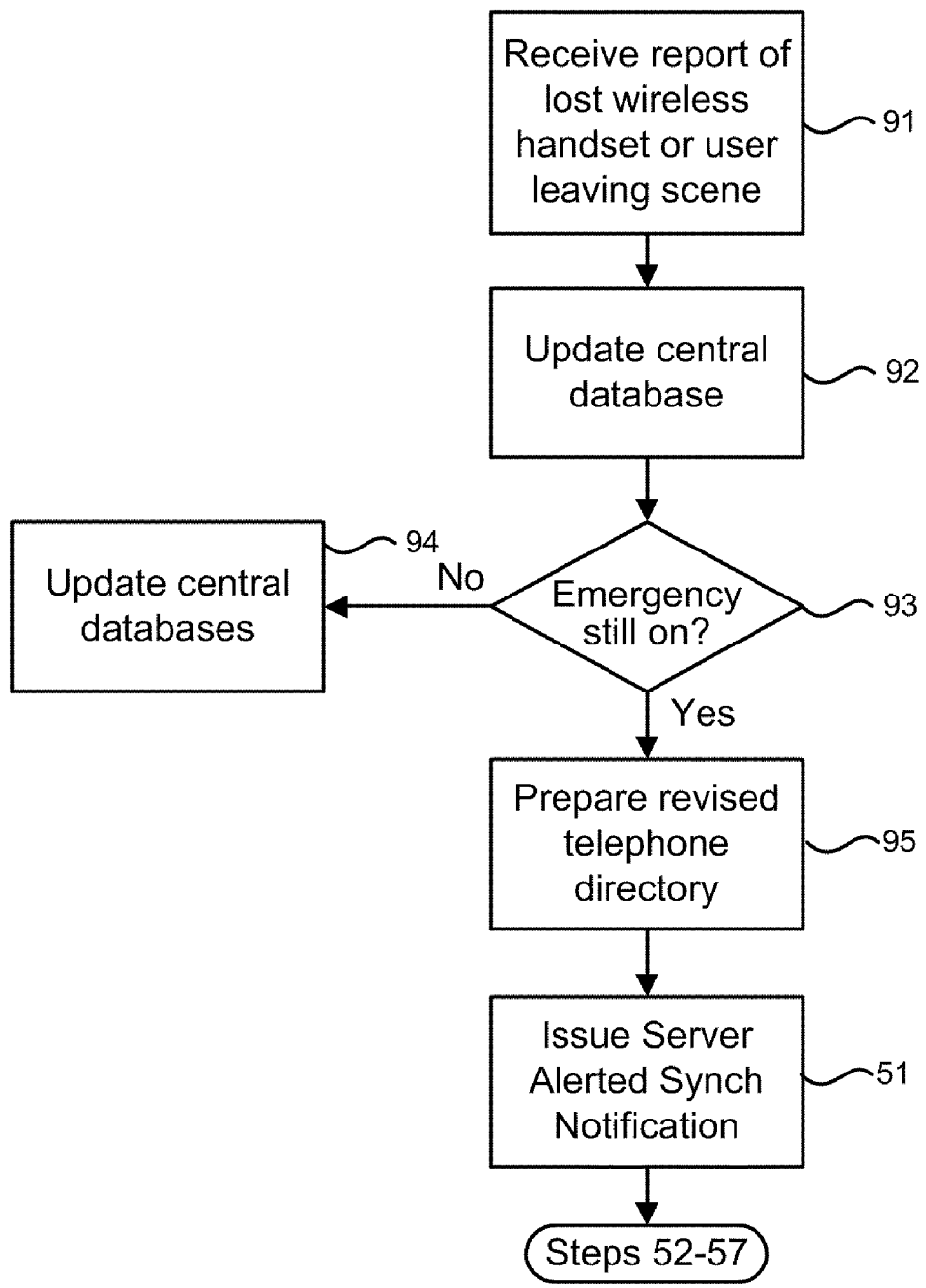
FIG. 10 is a process flow diagram for removing wireless handsets from the dynamic telephone directory in response to wireless handsets being lost or personnel leaving the scene.

In addition to adding new members to the response team, it may be necessary to delete members from the response team or delete wireless handsets from the telephone directory which have been decommissioned, lost or destroyed. By updating the incident-specific telephone directory to remove telephone numbers which are no longer active or of personnel no longer involved in the incident, individuals will not be mislead or frustrated by an accurate entries. Example steps that may be implemented to remove records from the telephone directory are illustrated in FIG. 10. The central database server 314 may receive a report that a wireless handset has been lost or that the emergency services personnel who owns the wireless handset is leaving the scene of the incident, step 91. This report may be provided in the form of an e-mail, SMS message or other electronic message delivered directly to the central database server 314. Alternatively, individuals may telephone at operator connected to the central database server to verbally report such event. As a further alternative, individuals may access the central database server 314 via the Internet in order to provide such information in response to a data entry website.

Having received information regarding any lost, decommissioned, or destroyed wireless handset or a departing owner of a wireless handset, the central database server can update the central database 316 to indicate that the individual is no longer on scene or delete the wireless handset telephone number, step 92. If the emergency or incident is still ongoing (i.e., test 93="Yes"), then the central database server 314 can prepare a revised telephone directory which reflects the reported changes, step 95. The central database server 314 may then proceed to distribute the revised telephone directory, such as by issuing a server alerted synchronization notification or other broadcasts notification to wireless handsets, step 51, and completing steps 52-57 as described above with reference to FIG. 6. If however the emergency or incident has been resolved (i.e., test 93="No"), and the central database server may simply update the central database, step 94, without taking any further actions. Thus, this process may be used during nonemergency times to enable individuals to update their records and report lost, decommissioned or destroyed wireless handsets.

The embodiments described herein may be implemented on any of a variety of wireless handsets. Typically, such wireless handsets will have in common the components illustrated in FIG. 11. For example, wireless handsets 130 may include a processor 131 coupled to internal memory 132 and a display 133. Additionally, wireless handsets 130 will have an antenna 134 for sending and receiving electromagnetic radiation that is connected to a wireless data link and/or cellular telephone transceiver 135 coupled to the processor 131. In some implementations, the transceiver 135 and portions of the processor 131 and memory 132 used for cellular telephone communications are collectively referred to as the air interface since it provides a data interface via a wireless data link. Wireless handsets 130 also typically include a key pad 136 or miniature keyboard and menu selection buttons or rocker switches 137 for receiving user inputs. Wireless handsets 130 may also include a global positioning system (GPS) receiver 138 coupled to the antenna 134 and the processor 131. As is well known in the art, GPS receivers 138 are integrated circuit devices which receive GPS satellite signals and derive global position coordinate information from those signals which can be provided to the processor 131.

Figure 12:
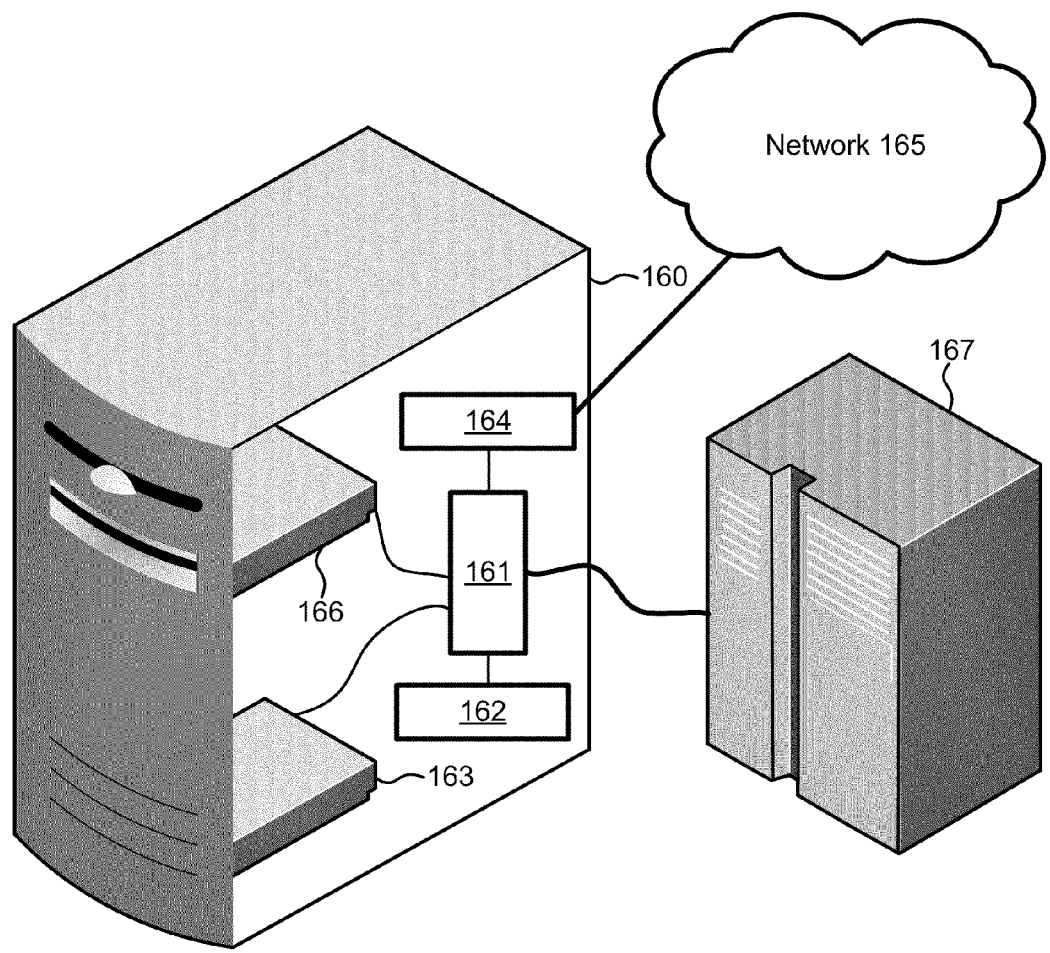
FIG. 12 is a component block diagram of a server suitable for use with the various embodiments.

The embodiments described above may also be implemented on any of a variety of server systems such as illustrated in FIG. 12. Such a server 160 typically includes a processor 161 coupled to volatile memory 162 and a large capacity nonvolatile memory, such as a disk drive 163. The processor 161 is coupled to one or more network interface circuits, such as high speed modems 164 coupled to a network 165 such as the Internet. The server 160 may also include a portable media reader, such as a compact disc (CD) drive 166 coupled to the processor 161. In some embodiments the server 160 may be coupled to one or more large data storage unit 167 for storing large databases, such as the central database described above. Such large data storage units typically include a large capacity magnetic memory storage disc drive coupled to interface circuitry for connecting to the server 160.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order.

The hardware used to implement the foregoing embodiments may be processing elements and memory elements configured to execute a set of instructions, including microprocessor units, microcomputer units, programmable floating point gate arrays (FPGA), and application specific integrated circuits (ASIC) as would be appreciated by one of skill in the art, wherein the set of instructions are for performing method steps corresponding to the above methods. Alternatively, some steps or methods may be performed by circuitry that is specific to a given function.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory. References herein to the memory of a mobile handset are intended to encompass any one or all memory modules within the mobile handset without limitation to a particular configuration, type or packaging. An exemplary storage medium is coupled to a processor in either the mobile handset or the theme server such that the processor can read information from, and write information to, the storage medium. In the alternative, the storage medium may be integral to the processor. The processor and the storage medium may reside in an ASIC.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

I claim:

1. A method for providing a dynamic telephone directory to wireless handsets of emergency services personnel, comprising:
   maintaining a central database of emergency services personnel, the central database including contact information of emergency services personnel;
   determining which wireless handsets of emergency services personnel are located within an incident response area;
   configuring a telephone directory file including names and wireless handset telephone numbers of the emergency services personnel located within the incident response area and selected emergency services personnel not located within the incident response area using information contained in the central database; and
   delivering the telephone directory file to the wireless handsets of emergency services personnel located within the incident response area and to every wireless handset listed in the telephone directory file.

2. The method of claim 1, wherein the step of selecting emergency services personnel not located within the incident response area that should be included in the telephone directory file is based upon incident type.

3. The method of claim 1, wherein the step of selecting emergency services personnel not located within the incident response area that should be included in the telephone directory file is based upon an agency affiliation of the emergency services personnel.

4. The method of claim 1, wherein the step of selecting emergency services personnel not located within the incident response area that should be included in the telephone directory file is based upon an incident response responsibility of the emergency services personnel.

5. The method of claim 1, wherein the step of selecting emergency services personnel not located within the incident response area that should be included in the telephone directory file is based upon a location of the incident.

6. The method of claim 1, wherein the step of determining which wireless handsets of emergency services personnel are located within the incident response area comprises obtaining an identifier for each wireless handset connected to a private network provided by a deployable switch on wheels.

7. The method of claim 1, wherein the step of determining which wireless handsets of emergency services personnel located are within the incident response area comprises:
   sending a message to wireless handsets of emergency services personnel requesting the wireless handsets to report their location;
   receiving location reports from wireless handsets of emergency services personnel; and
   comparing received location reports to a location of the incident to identify those wireless handsets within the incident response area.

8. The method of claim 1, wherein the step of determining which wireless handsets of emergency services personnel are located within the incident response area comprises:
   sending a message to wireless handsets of emergency services personnel identifying a location of the incident and requesting the wireless handsets to report their location; and
   receiving location reports from wireless handsets of emergency services personnel located within the incident response area.

9. The method of claim 2, wherein the step of selecting emergency services personnel not located within the incident response area that should be included in the telephone directory file further comprises:
   identifying a response plan corresponding to the incident type; and
   determining from the identified response plan emergency services personnel and government personnel that should be included in the telephone directory file.

10. The method of claim 1, wherein the step of delivering the telephone directory file to the wireless handsets of emergency services personnel located within the incident response area comprises:
    notifying wireless handsets to establish a data communication connection to a central database server;
    establishing a data communication connection between the central database server and the wireless handsets; and
    downloading the telephone directory file to the wireless handset via the established data communication connection.

11. The method of claim 1, wherein the step of delivering the telephone directory file to the wireless handsets of emergency services personnel located within the incident response area comprises transmitting the telephone directory file to the wireless handsets using XML-based Over The Air transmissions in accordance with Open Mobile Alliance Data Synchronization standards.

12. The method of claim 1, wherein the step of configuring the telephone directory file comprises configuring the telephone directory file in accordance with Lightweight Directory Access Protocol standards.

13. The method of claim 1, further comprising:
    receiving a request to add an individual to the telephone directory file;
    verifying that the request is from a person authorized to add individuals to the telephone directory file;
    receiving a telephone number of a new wireless handset of the individual to be added to the telephone directory file if the request is from the person authorized to add individuals to the telephone directory file;
    contacting the individual to be added at the received telephone number;

obtaining identification information from the individual to be added;

storing the obtained identification information and received new wireless handset telephone number in the central database of emergency services personnel;

revising the telephone directory file to included the individual to be added;

delivering the revised telephone directory file to the new wireless handset of the individual to be added; and delivering the revised telephone directory file to the wireless handsets of emergency services personnel located within the incident response area.

14. The method of claim 1, further comprising:

receiving a report of an old wireless handset no longer in the incident response area; revising the telephone directory file to delete the telephone number of the old wireless handset no longer in the incident response area; and delivering the revised telephone directory file to the wireless handsets of emergency services personnel located within the incident response area.

15. A server, comprising:

a processor;

a network interface circuit coupled to the processor, the network interface circuit configured to connect the processor to a communication network; and a memory storage unit coupled to the processor, the memory storage unit having stored thereon a database of emergency services personnel including contact information of emergency services personnel, wherein the processor is configured with processor-executable instructions to perform steps comprising:

determining which wireless handsets of emergency services personnel are located within an incident response area;

configuring a telephone directory file including names and wireless handset telephone numbers of the emergency services personnel located within the incident response area and selected emergency services personnel not located within the incident response area using information contained in the central database; and delivering the telephone directory file to the wireless handsets of emergency services personnel located within the incident response area and to every wireless handset listed in the telephone directory file.

16. The server of claim 15, wherein the processor is configured with processor-executable instructions such that the step of selecting emergency services personnel not located within the incident response area that should be included in the telephone directory file is based upon incident type.

17. The server of claim 15, wherein the processor is configured with processor-executable instructions such that the step of selecting emergency services personnel not located within the incident response area that should be included in the telephone directory file is based upon an agency affiliation of the emergency services personnel.

18. The server of claim 15, wherein the processor is configured with processor-executable instructions such that the step of selecting emergency services personnel not located within the incident response area that should be included in the telephone directory file is based upon an incident response responsibility of the emergency services personnel.

19. The server of claim 15, wherein the processor is configured with processor-executable instructions such that the step of selecting emergency services personnel not located within the incident response area that should be included in the telephone directory file is based upon a location of the incident.

20. The server of claim 15, wherein the processor is configured with processor-executable instructions such that the step of determining which wireless handsets of emergency services personnel are located within the incident response area comprises obtaining an identifier for each wireless handset connected to a private network provided by a deployable switch on wheels.

21. The server of claim 15, wherein the processor is configured with processor-executable instructions such that the step of determining which wireless handsets of emergency services personnel are located within the incident response area comprises:

sending a message to wireless handsets of emergency services personnel requesting the wireless handsets to report their location;

receiving location reports from wireless handsets of emergency services personnel; and comparing received location reports to a location of the incident to identify those wireless handsets within the incident response area.

22. The server of claim 15, wherein the processor is configured with processor-executable instructions such that the step of determining which wireless handsets of emergency services personnel are located within the incident response area comprises:

sending a message to wireless handsets of emergency services personnel identifying a location of the incident and requesting the wireless handsets to report their location; and receiving location reports from wireless handsets of emergency services personnel located with in the incident response area.

23. The server of claim 16, wherein the processor is configured with processor-executable instructions such that the step of selecting emergency services personnel not located within the incident response area that should be included in the telephone directory file further comprises:

identifying a response plan corresponding to the incident type; and determining from the identified response plan emergency services personnel and government personnel that should be included in the telephone directory file.

24. The server of claim 15, wherein the processor is configured with processor-executable instructions such that the step of delivering the telephone directory file to the wireless handsets of emergency services personnel located within the incident response area comprises:

notifying wireless handsets to establish a data communication connection to a central database server;

establishing a data communication connection between the central database server and the wireless handsets; and downloading the telephone directory file to wireless handsets via the established data communication connection.

25. The server of claim 15, wherein the processor is configured with processor-executable instructions such that the step of delivering the telephone directory file to the wireless handsets of emergency services personnel located within the incident response area comprises transmitting the telephone directory file to the wireless handsets using XML-based Over The Air transmissions in accordance with Open Mobile Alliance Data Synchronization standards.

26. The server of claim 15, wherein the processor is configured with processor-executable instructions such that the step of configuring the telephone directory file comprises configuring the telephone directory file in accordance with Lightweight Directory Access Protocol standards.

27. The server of claim 15, wherein the processor is configured with processor-executable instructions to perform steps further comprising:
    receiving a request to add an individual to the telephone directory file;
    verifying that the request is from a person authorized to add individuals to the telephone directory file;
    receiving a telephone number of a new wireless handset of the individual to be added to the telephone directory file if the request is from the person authorized to add individuals to the telephone directory file;
    contacting the individual to be added at the received telephone number; obtaining identification information from the individual to be added;
    storing the obtained identification information and received new wireless handset telephone number in the database of emergency services personnel;
    revising the telephone directory file to included the individual to be added;
    delivering the revised telephone directory file to the new wireless handset of the individual to be added; and
    delivering the revised telephone directory file to the wireless handsets of emergency services personnel located within the incident response area.

28. The server of claim 15, wherein the processor is configured with processor-executable instructions to perform steps further comprising:
    receiving a report of an old wireless handset no longer in the incident response area;
    revising the telephone directory file to delete a telephone number of the old wireless handset no longer in the incident response area; and
    delivering the revised telephone directory file to the wireless handsets of emergency services personnel located within the incident response area.

29. A server-readable tangible storage medium having stored thereon server-processor executable instructions configured to cause a server processor to perform steps comprising:
    determining which wireless handsets of emergency services personnel are located within an incident response area;
    configuring a telephone directory file including contact information of the emergency services personnel located within the incident response area and selected emergency services personnel not located within the incident response area using information contained in a database of emergency services personnel; and
    delivering the telephone directory file to the wireless handsets of emergency services personnel located within the incident response area and to every wireless handset listed in the telephone directory file.

30. The server-readable tangible storage medium of claim 29 having stored thereon server-processor executable instructions configured to cause a server processor such that the step of selecting emergency services personnel not located within the incident response area that should be included in the telephone directory file is based upon incident type.

31. The server-readable tangible storage medium of claim 29 having stored thereon server-processor executable instructions configured to cause a server processor such that the step of selecting emergency services personnel not located within the incident response area that should be included in the telephone directory file is based upon an agency affiliation of the emergency services personnel.

32. The server-readable tangible storage medium of claim 29 having stored thereon server-processor executable instructions configured to cause a server processor such that the step of selecting emergency services personnel not located within the incident response area that should be included in the telephone directory file is based upon an incident response responsibility of the emergency services personnel.

33. The server-readable tangible storage medium of claim 29 having stored thereon server-processor executable instructions configured to cause a server processor such that the step of selecting emergency services personnel not located within the incident response area that should be included in the telephone directory file is based upon a location of the incident.

34. The server-readable tangible storage medium of claim 29 having stored thereon server-processor executable instructions configured to cause a server processor such that the step of determining which mobile devices of emergency services personnel are located within the incident response area comprises obtaining an identifier for each wireless handset connected to a private network provided by a deployable switch on wheels.

35. The server-readable tangible storage medium of claim 29 having stored thereon server-processor executable instructions configured to cause a server processor such that the step of determining which wireless handsets of emergency services personnel located are within the incident response area comprises:
    sending a message to wireless handsets of emergency services personnel requesting the wireless handsets to report their location;
    receiving location reports from wireless handsets of emergency services personnel; and
    comparing received location reports to a location of the incident to identify those wireless handsets within the incident response area.

36. The server-readable tangible storage medium of claim 29 having stored thereon server-processor executable instructions configured to cause a server processor such that the step of determining which wireless handsets of emergency services personnel are located within the incident response area comprises:
    sending a message to wireless handsets of emergency services personnel identifying a location of the incident and requesting the wireless handsets to report their location; and
    receiving location reports from wireless handsets of emergency services personnel located within the incident response area.

37. The server-readable tangible storage medium of claim 30 having stored thereon server-processor executable instructions configured to cause a server processor such that the step of selecting emergency services personnel not located within the incident response area that should be included in the telephone directory file further comprises:
    identifying a response plan corresponding to the incident type; and
    determining from the identified response plan emergency services personnel and government personnel that should be included in the telephone directory file.

38. The server-readable tangible storage medium of claim 29 having stored thereon server-processor executable instructions configured to cause a server processor such that the step of delivering the telephone directory file to the wireless handsets of emergency services personnel located within the incident response area comprises:

notifying wireless handsets to establish a data communication connection to a central database server;
establishing a data communication connection between the central database server and the wireless handsets; and
downloading the telephone directory file to wireless handsets via the established data communication connection.

39. The server-readable tangible storage medium of claim 29 having stored thereon server-processor executable instructions configured to cause a server processor such that the step of delivering the telephone directory file to the wireless handsets of emergency services personnel located within the incident response area comprises transmitting the telephone directory file to the wireless handsets using XML-based Over The Air transmissions in accordance with Open Mobile Alliance Data Synchronization standards.

40. The server-readable tangible storage medium of claim 29 having stored thereon server-processor executable instructions configured to cause a server processor such that the step of configuring the telephone directory file comprises configuring the telephone directory file in accordance with Lightweight Directory Access Protocol standards.

41. The server-readable tangible storage medium of claim 29 having stored thereon server-processor executable instructions configured to cause a server processor to perform steps further comprising:
receiving a request to add an individual to the telephone directory file;
verifying that the request is from any of a number of persons authorized to add individuals to the telephone directory file;
receiving a telephone number of a new wireless handset of the individual to be added to the telephone directory file if the request is from the any of a number of persons authorized to add individuals to the telephone directory file;
contacting the individual to be added at the received telephone number; obtaining identification information from the individual to be added;
storing the obtained identification information and received new wireless handset telephone number in the database of emergency services personnel;
revising the telephone directory file to included the individual to be added;
delivering the revised telephone directory file to the new wireless handset of the individual to be added; and
delivering the revised telephone directory file to the wireless handsets of emergency services personnel located within the incident response area.

42. The server-readable tangible storage medium of claim 29 having stored thereon server-processor executable instructions configured to cause a server processor to perform steps further comprising:
receiving a report of an old wireless handset no longer in the incident response area; revising the telephone directory file to delete a telephone number of the old wireless handset no longer in the incident response area; and
delivering the revised telephone directory file to the wireless handsets of emergency services personnel located within the incident response area.

43. A system, comprising:
a central database server coupled to a network; and
a plurality of wireless handsets used by emergency services personnel, wherein the central database server comprises:
a server processor;
network interface circuit coupled to the server processor, the network interface circuit configured to connect the server processor to the network; and
a memory storage unit coupled to the server processor, the memory storage unit having stored thereon a database of emergency services personnel including contact information of emergency services personnel, wherein the server processor is configured with processor-executable instructions to perform steps comprising:
determining which wireless handsets used by emergency services personnel are located within an incident response area;
configuring a telephone directory file including contact information of the emergency services personnel located within the incident response area and selected emergency services personnel not located within the incident response area using information contained in the central database; and
transmitting the telephone directory file to the plurality of wireless handsets and to every wireless handset listed in the telephone directory file, and each of the plurality of wireless handsets comprises:
a wireless handset processor;
a transceiver coupled to the wireless handset processor, the transceiver configured to connect the wireless handset processor to a cellular communication network; and
a wireless handset memory coupled to the wireless handset processor, the memory configured to store the telephone directory file, wherein the wireless handset processor is configured with processor-executable instructions to perform steps comprising:
receiving via the transceiver the telephone directory file transmitted by the central database server; and
storing the received telephone directory file in the wireless handset memory.

44. The system of claim 43, further comprising a switch on wheels deployed in the incident response area, the switch on wheels comprising:
a switch processor;
a cellular communications transceiver coupled to the switch processor; and
a satellite communication uplink unit coupled to the switch processor, wherein the switch processor is configured with processor-executable software instructions to perform steps comprising:
providing a private cellular communication network via the cellular communications transceiver;
identifying wireless handsets connected to the private cellular communication network with identifier; and
transmitting the identifiers of the wireless handsets connected to the private cellular communication network to the central database server via the satellite uplink unit, wherein the server processor step of determining which wireless handsets of emergency services personnel are located within the incident response area comprises:
receiving from the switch on wheels the identifiers of the wireless handsets connected to the private cellular communication network; and
using the wireless handset identifiers to look up corresponding emergency services personnel records within the database of emergency services personnel.

45. The system of claim 43, wherein the central database server processor is configured with processor-executable instructions such that the step of determining which wireless handsets of emergency services personnel located are within the incident response area comprises:

sending a message to each of the wireless handsets requesting each of the wireless handsets to report their location;

receiving location reports from the wireless handsets of emergency services personnel; and comparing received location reports to a location of the incident to identify those wireless handsets within the incident response area, and wherein each of the plurality of wireless handset's wireless handset processor is configured with processor-executable instructions to perform steps further comprising:

receiving the message from the central database server requesting the wireless handsets to report their location;

generating a location report of the wireless handset; and transmitting the location report to the central database server.

46. The system of claim 43, wherein the central database server processor is configured with processor-executable instructions such that the step of determining which wireless handsets of emergency services personnel located are within the incident response area comprises:

sending a message to wireless handsets of emergency services personnel identifying a location of the incident and requesting the wireless handsets to report their location; and receiving location reports from wireless handsets of emergency services personnel located with in the incident response area, and wherein each of the plurality of wireless handset's wireless handset processor is configured with processor-executable instructions to perform steps further comprising:

receiving the message from the central database server identifying a location of the incident and requesting the wireless handsets to report their location;

determining a location of the wireless handset; comparing the determined location of the wireless handset to the received incident location to determine if the wireless handset is within the incident response area; and transmitting a location report to the central database server if the wireless handset is within the incident response area.

47. The method of claim 13, further comprising:

delivering the revised telephone directory file to every wireless handset listed in the telephone directory file.

48. The method of claim 14, further comprising:

delivering the revised telephone directory file to every wireless handset listed in the telephone directory file.

49. The server of claim 27, wherein the processor is configured with processor-executable instructions to perform steps further comprising:

delivering the revised telephone directory file to every wireless handset listed in the telephone directory file.

50. The server of claim 28, wherein the processor is configured with processor-executable instructions to perform steps further comprising:

delivering the revised telephone directory file to every wireless handset listed in the telephone directory file.

51. The server-readable tangible storage medium of claim 41 having stored thereon server-processor executable instructions configured to cause a server processor to perform steps further comprising:

delivering the revised telephone directory file to every wireless handset listed in the telephone directory file.

52. The server-readable tangible storage medium of claim 42 having stored thereon server-processor executable instructions configured to cause a server processor to perform steps further comprising:

delivering the revised telephone directory file to every wireless handset listed in the telephone directory file.

* * * * *